United States Patent

[11] 3,542,441

| [72] | Inventor | Donald R. Nixon |
| | | Monroeville, Pennsylvania |
| [21] | Appl. No. | 716,807 |
| [22] | Filed | March 28, 1968 |
| [45] | Patented | Nov. 24, 1970 |
| [73] | Assignee | Westinghouse Electric Corporation |
| | | Pittsburgh, Pennsylvania |
| | | a corporation of Pennsylvania |

[54] CONTROLLED CLEARANCE SELF-ALIGNING BEARING
10 Claims, 5 Drawing Figs.

[52] U.S. Cl. ................................................. 308/73
[51] Int. Cl. ................................................. F16c 41/02
[50] Field of Search ................................. 308/26, 73, 160

[56] References Cited
UNITED STATES PATENTS

| 1,117,504 | 11/1914 | Kingsbury | 308/160 |
| 1,438,053 | 12/1922 | Parsons | 308/160 |
| 2,477,139 | 7/1949 | Patton | 308/237 |
| 2,785,022 | 3/1957 | Lakey | 308/160 |
| 2,897,026 | 7/1959 | Haller | 308/26UX |
| 2,970,019 | 1/1961 | Brown | 308/237 |
| 2,956,841 | 10/1960 | Cametti | 308/237X |
| 3,393,023 | 7/1968 | Christan | 308/73 |
| 2,590,761 | 3/1952 | Edgar | 308/237A |
| 2,941,850 | 6/1960 | Warner | 308/73 |
| 3,337,276 | 8/1967 | Cherubin | 308/73 |

Primary Examiner—Wesely S. Ratliff, Jr.
Attorneys—A. T. Stratton and Z. L. Dermer ABSTRACT: In a self-aligning bearing having a journal sleeve mounted on a spring cage on a shaft and a plurality of segmented bearing pads or shoes surrounding the journal sleeve, a substantially constant running gap or clearance between the pads and the sleeve is maintained over a wide operating temperature range by encircling the pads with a pivot ring of low expansion material which is flexibly mounted on a spring cage in the bearing housing. The ring and the pads are machined to permit the pads to tilt vertically.

Patented Nov. 24, 1970

INVENTOR
Donald R. Nixon
BY *Zigmund L. Feimey*
ATTORNEY

CONTROLLED CLEARANCE SELF-ALIGNING BEARING

BACKGROUND OF THE INVENTION

This invention relates, generally, to bearings and, more particularly, to self-alining bearings of the pivoted pad or shoe type.

For applications where relatively large diameter pivoted pad bearings must operate over a wide temperature range, a mismatch of coefficients of thermal expansion of the journal and bearing materials causes changes in running clearance. Improper running clearances can result in malfunction or failure of the bearing. For certain applications, such as liquid metal and water lubricated bearings, the selection of materials for reasons of corrosion and wear resistance does not allow a good match of coefficients of thermal expansion. Most of the materials with good corrosion and wear properties, for example, graphite, carbides and ceramics, have low coefficients of thermal expansion. Most of the better and less expensive structural materials for bearing housings and shafts, such as stainless steel, having relatively higher coefficients of thermal expansion.

An object of this invention is to provide a radial bearing assembly which will operate with an essentially constant radial clearance between a rotating journal and a stationary set of segmented bearing pads over a wide temperature range.

SUMMARY OF THE INVENTION

In accordance with one embodiment of the invention, a pivot ring of low expansion material is mounted on a spring cage in a bearing housing. The ring encircles a plurality of segmented bearing pads which surround a journal sleeve mounted on a spring cage on a shaft. The ring and the pads are machined to permit the pads to tilt vertically. Thus, the pads are supported vertically and radially, in the outward direction, by the pivot ring, and the radial motion of the pads, due to thermal expansion, is controlled by the expansion of the pivot ring rather than the bearing housing, as was the case in prior pivoted pad bearing assemblies.

BRIEF DESCRIPTION OF THE DRAWING

For a better understanding of the nature and objects of the invention, reference may be had to to the following detailed description, taken in conjunction with the accompanying drawings, in which.

DESCRIPTION OF PREFERRED EMBODIMENTS

Figure 1:
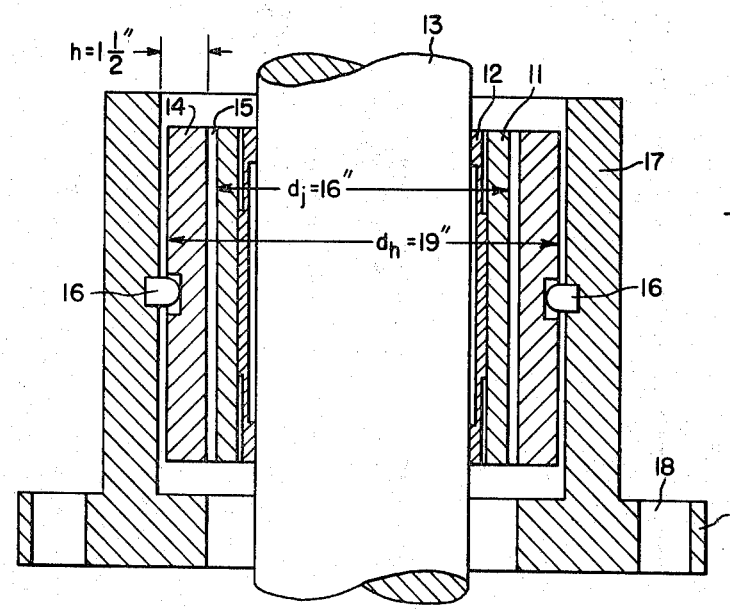
FIG. 1 is a diagrammatic view, in section, of a pivoted pad bearing assembly constructed in accordance with the prior art.

In the conventional bearing assembly shown in FIG. 1, a journal sleeve 11 is supported by a spring cage 12 which is mounted on a rotatable shaft 13. A plurality of segmented pads or shoes 14 surround the journal sleeve 11 with a running gap or clearance 15 between the sleeves and the pads 14. In the drawing, the thickness of the gap 15 is greatly exaggerated. Each pad or shoe 14 is pivotally mounted on a pivot pin 16 fixed in a generally cylindrical bearing housing 17. The housing 17 may be mounted on a suitable supporting structure (not shown) by inserting bolts in holes 18 in an outwardly extending flange 19 on the bottom of the housing 17.

In prior bearing assemblies the bearing housing 17 has been composed of stainless steel having a coefficient of thermal expansion of $10.3 \times 10^{-6}$ 1N/1N/°F. The bearing pads or shoes 14 have been composed of carbide having a coefficient of thermal expansion of $4.5 \times 10^{-6}$ 1N/1N/°F. The journal sleeve 11 has been composed of Stellite having a coefficient of thermal expansion of $7 \times 10^{-6}$ 1N/1N/°F. The shaft 13 has been composed of stainless steel and the journal spring cage 12 has been composed of Inconel. However, since the journal sleeve 11 is supported by flexible leaves in the spring cage 12, the expansion of the shaft and the spring cage does not affect the running clearance or gap of the bearing assembly. Test and operational experience in low viscosity fluid, such as sodium, has shown that a bearing material combination of Stellite vs. carbide provides excellent corrosion and wear resistance at temperatures up to 1,000°F. However, if a conventional pivoted pad bearing assembly, such as that shown in FIG. 1 and composed of the aforementioned materials, were heated from 100° F. to 1,000°F., the bearing housing inside diameter (I.D.) would increase 176 mils while the journal outside diameter (O.D.) would only increase 100 mils. The increase in thickness of the carbide shoes would be approximately 6 mils. The change in radial running clearance would be 32 mils.

$$\Delta C = \frac{\Delta d_{housing} - \Delta d_{journal}}{2} - \Delta h_{pad} = \frac{176 - 100}{2} - 6 = 32 \text{ mils}$$

$\Delta d_{housing} = d_h \, \alpha \Delta T = 19 \times 10.3 \times 10^{-6} \times 900 = 176$ mils $\Delta d_{journal} = d_j \, \alpha \Delta T = 16 \times 7 \times 10^{-6} \times 900 = 100$ mils $\Delta h = h \, \alpha \Delta T = 1.5 \times 4.5 \times 10^{-6} \times 900 = 6$ mils Normal design running clearance for the aforesaid bearing would be approximately 10—15 mils. An increase in clearance of 32 mils would cause malfunction of the bearing and probably failure of the bearing.

One solution to the problem of excessive clearance would be to make the bearing housing from a material with a lower coefficient of expansion. However, the low expansion housing would have to be joined to other structural members, for example a pump for handling high-temperature liquid, and a mismatch of expansion would occur at this junction unless the entire pump were made from low expansion material. For cost reasons it is desirable to utilize stainless steel for the major pump structural members including the bearing housing. Previous techniques for maintaining proper bearing clearance have been prohibitively expensive for large bearing applications.

Figure 2:
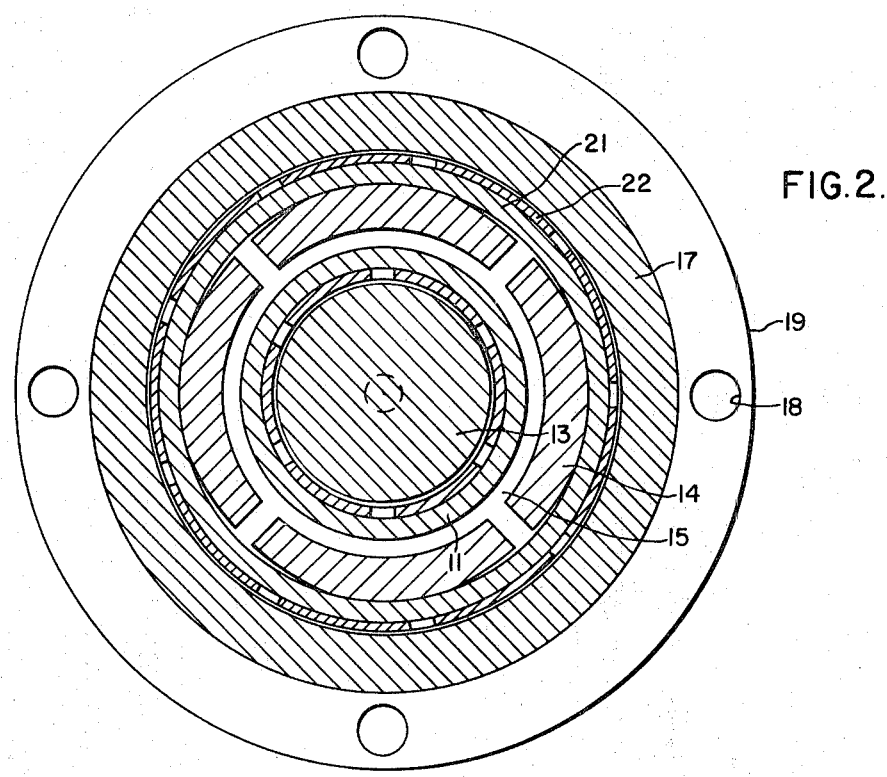
FIG. 2 is a diagrammatic view, in horizontal section, of a controlled clearance pivoted pad bearing assembly embodying principal features of the present invention, certain of the clearances between parts of the assembly being exaggerated.
Figure 3:
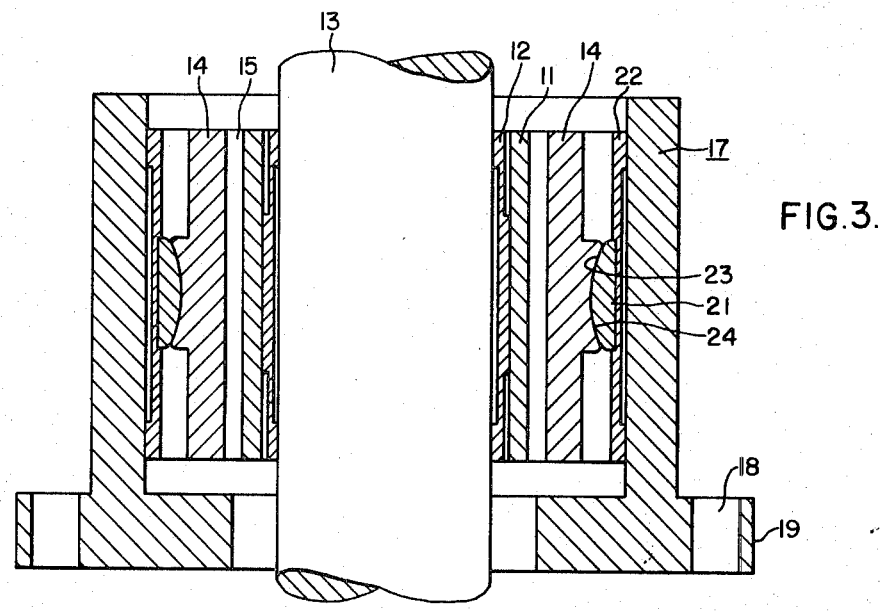
FIG. 3 is a view, in vertical section, of the bearing assembly shown in FIG. 2.

The bearing assembly shown in FIGS. 2 and 3 provides a practical method of maintaining a substantially constant bearing clearance over a wide operating temperature range. In the assembly of FIGS. 2 and 3, a pivot ring 21 of low expansion material (same as journal material in this case) is flexibly mounted on a spring cage 22 in the bearing housing 17. The ring encircles the midsections of a plurality of segmented bearing pads 14 which surround the journal sleeve 11. The ring 21 is radiused on the I.D. at 23 in the vertical plane, as shown in FIG. 3, to match a radius machined at 24 on the back of each pad of its midsection. The back of each pad 14 is the face of the pad opposite the face which confronts the journal sleeve 11. The coacting arcuate surfaces 23 and 24 permit the pads 14 to tilt vertically or in a plane parallel to the plane of the shaft 13. The I.D. of the ring 21 is machined slightly larger than the O.D. of the backs of the pads 14 in a plane perpendicular to the plane of the shaft. This allows the pads to rock on the ring in a plane perpendicular to the plane of the shaft. Thus, the pads are supported vertically and radially (in the outward direction) by the pivot ring 21, and the radial motion of the pad, due to thermal expansion, is controlled by the expansion of the pivot ring rather than the bearing housing. Since the ring 21 is flexibly mounted in the spring cage 22 in the bearing housing 17, the expansion of the bearing housing and the spring cage does not affect the ring 21.

The change in radial running clearance (for the same running diameter and temperature as in the case for FIG. 1) for this bearing is only 4 mils.

$$\Delta C = \frac{\Delta d_{\text{pivot ring}} - \Delta d_{\text{journal}}}{2} - \Delta h_{\text{pad}} = \frac{120-100}{2} - 6 = 4 \text{ mils}$$

$\Delta d_{\text{pivot ring}} = d_p \, \alpha \Delta T = 19 \times 7 \times 10^{-6} \times 900 = 120 \text{ mils}$ $\Delta d_{\text{journal}} = d_j \, \alpha \Delta T = 16 \times 7 \times 10^{-6} \times 900 = 100 \text{ mils}$ $\Delta h_{\text{pad}} = h \, \alpha \Delta T = 1.5 \times 4.5 \times 900 = 6 \text{ mils}$ A change in clearance of 4 mils on a 16" diameter bearing is acceptable.

Figure 4:
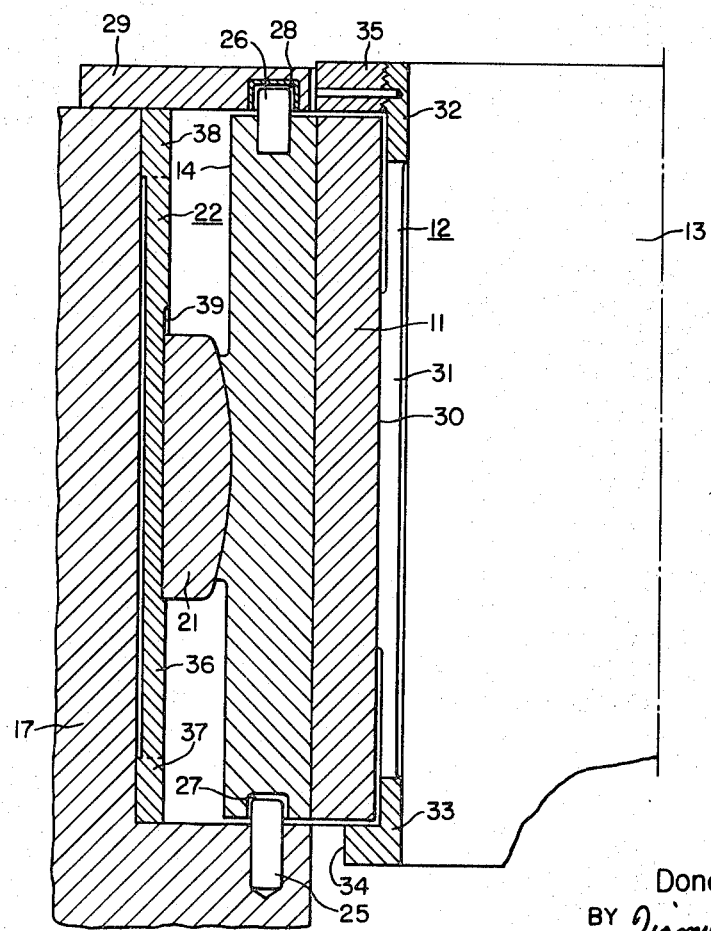
FIG. 4 is a view, in vertical section, of a portion of a commercial form of the bearing assembly shown in FIGS. 2 and 3.

A commercial form of a bearing assembly constructed in accordance with the present invention is shown in FIG. 4. In this structure the pivot ring 21 and the journal sleeve 11 are composed of satellite. The shoes or pads 14 are composed of titanium carbide, the housing 17 is composed of stainless steel and the spring cages 12 and 22 are composed of Inconel. The members of the bearing assembly are arranged in a manner similar to that shown in FIGS. 2 and 3. Rotation of the pads 14 is prevented by pins 25 and 26 disposed at the bottom and the top of each pad. As shown in FIG. 4, the pin 25 is fixed in the base of the housing 17 and extends into a recess 27 in the lower end of the pad 14. The pin 26 is fixed in the upper end of the pad 14 and extends into a recess 28 in a ring 29 mounted at the top of the bearing housing 17. Sufficient clearance is provided in the recesses for the pins to permit self-alining movement of the pads 14 which are supported by the pivot ring 21 in the manner hereinbefore described.

The spring cages 12 and 22 may be constructed in a manner well known in the art. The spring cage 12 comprises a plurality of spaced leaf members 31 formed integrally with or secured to spaced rings 32 and 33 secured to the shaft 13. Each leaf member 31 has a protuberance 30 thereon contacting the sleeve 11. The ring 33 has an outwardly extending flange 34 which supports the journal sleeve 11. A keeper ring 35 is threaded onto the ring 32 to prevent upward movement of the journal sleeve 11.

Likewise, the spring cage 22, which supports the pivot ring 21, comprises a plurality of spaced leaf members 36 formed integrally with or secured to spaced rings 37 and 38 mounted in the bearing housing 17. Each leaf member 36 is recessed slightly at 39 to receive the pivot ring 21.

The materials combination and assembly technique for the bearing shown in FIGS. 2 and 3, and detailed in FIG. 4, were selected for a specific application involving a 16" diameter bearing operating in 1,000°F. sodium. For other sizes, fluids or temperatures, different materials which fits the geometry would be utilized. However, the principle of using a flexibly-mounted, controlled-expansion pivot ring would be utilized. By using a pivot ring made of a material with a lower coefficient of expansion than that of the journal, bearing clearance could be reduced as temperature increases. This would provide compensation for a reduction of lubricating fluid viscosity with temperature.

The controlled clearance feature of the pivoted pad bearing assembly herein described can also be applied to a hydrostatic bearing assembly of the type disclosed in a copending U.S. Pat. application Ser. No. 716,804, filed March 28, 1968, now U.S. Pat. No. 3,476,447, by John Boyd.

Figure 5:
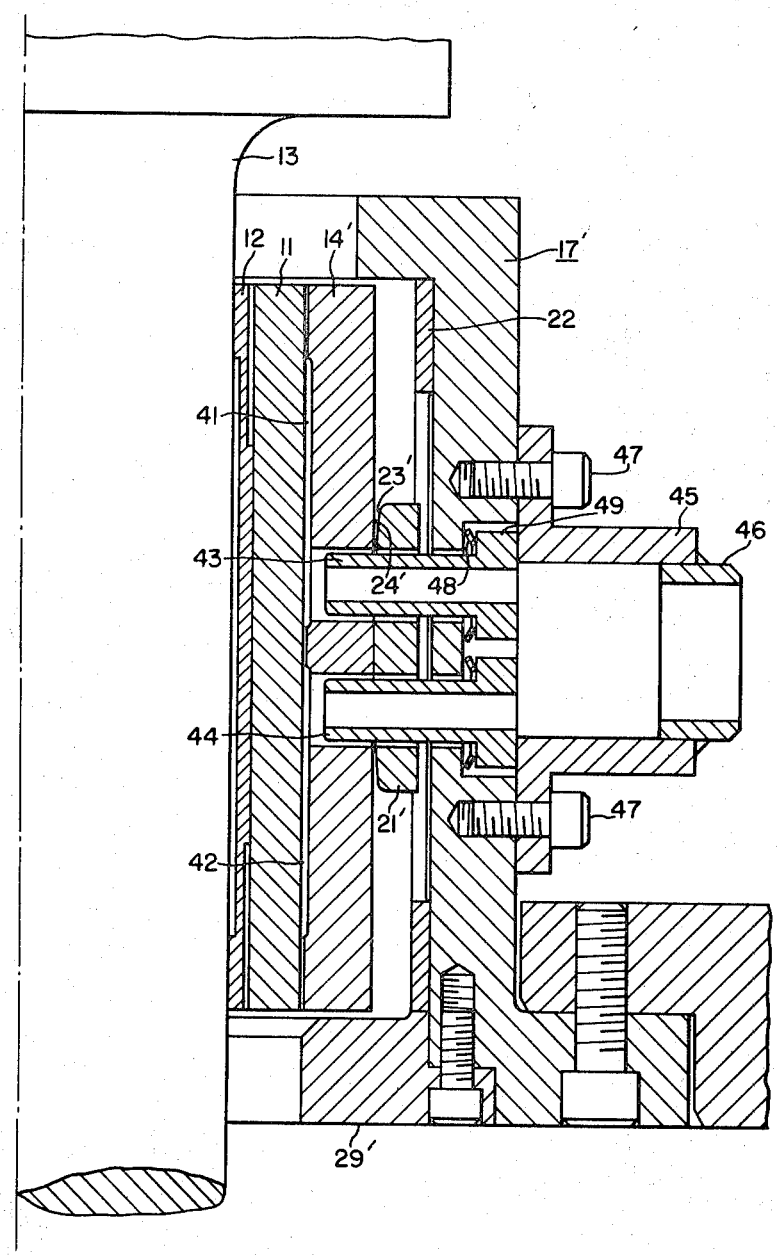
FIG. 5 is a view, in vertical section, of a portion of a self-alining hydrostatic bearing assembly embodying features of the present invention.

A self-alining, controlled clearance, hydrostatic bearing assembly is shown in FIG. 5. The bearing assembly comprises a bearing housing 17', a bearing spring cage 22 mounted in the housing 17', a rolling ring 21' supported by the cage 22, a segmented bearing cartridge comprising a plurality of, in this case three, bearing segments or pads 14' surrounding a journal sleeve 11 supported by a spring cage 12 secured on a shaft 13.

The bearing spring cage 22 provides flexibility between the bearing housing 17' and the rolling ring 21' to compensate for the differential expansion of the housing and the ring. The rolling ring 21' provides the radial support for the bearing segments 14'. The inside diameter of the rolling ring 21' is machined to a hyperbolic bore at 23' which coacts with a generally cylindrical outer surface 24' on the segments 14' to permit alinement of the bearing by a rolling motion of the bearing segments on the rolling ring. The outer surface of the bearing segments is the surface opposite the inner surface which confronts the journal sleeve 11. The differential expansion of the rolling ring is matched to the differential expansion of the journal sleeve to provide an essentially constant bearing clearance. As explained hereinbefore, this is accomplished by making the bearing sleeve and the rolling ring of the same material, such as Satellite.

Each of the bearing segments 14' has an upper pocket 41 and a lower pocket 42 machined in its inner surface to provide shaft support and alinement of the segment by hydrostatic action. Pressurized fluid is conducted to the pockets 41 and 42 from a pressurizing source through orifice pins 43 and 44, respectively. Two pins are provided for each segment 14'.

The relatively small-diameter orifice in each pin restricts the flow of fluid to provide compensating or restoring action of the bearing in a manner well known in the hydrostatic bearing art. The pins 43 and 44 extend through the housing 17' and the ring 21' and substantially through the pad or segment 14'. Therefore, the pins prevent rotation of the segments and support their weight. Sufficient clearance is provided between the pins and the segments to permit alining action of the bearing assembly.

A flanged entrance chamber 45 clamps the orifice pins 43 and 44 in place and provides a weld preparation for connecting a pressurizing pipe 46. The chamber 45 is attached to the housing 17' by bolts 47. The pins 43 and 44 are recessed in the housing 17'. A Belleville washer 48 is disposed between a flanged head 49 on each pin and the bottom of the recess for the pins to compress the head of the pin against the inner face of the entrance chamber 45 to prevent fluid leakage at this joint.

From the foregoing description, it is apparent that the invention provides a self-alining radial bearing assembly which will operate with an essentially constant running clearance over a wide temperature range. The controlled clearance feature may be utilized in a hydrostatic bearing as well as in a nonhydrostatic bearing assembly.

Since numerous changes may be made in the above described construction, and different embodiments of the invention may be made without departing from the spirit and scope thereof, it is intended that all subject matter contained in the foregoing description or shown in the accompanying drawing shall be interpreted as illustrative and not in a limiting sense.

I claim:

1. In a bearing assembly, in combination, a rotatable shaft, a journal sleeve mounted on the shaft, a plurality of segmented bearing pads surrounding the sleeve, a rigid ring encircling the midsections of the pads, the inside diameter of the ring having a curved surface coacting with a portion of the surface of each pad opposite the surface confronting the sleeve to permit the pads to tilt in a plane parallel to the plane of the shaft, and a housing enclosing the ring.

2. The combination defined in claim 1, including a spring cage in the housing supporting the ring and a spring cage on the shaft supporting the journal sleeve.

3. The combination defined in claim 1, including pins in the housing preventing rotation of the pads.

4. The combination defined in claim 2, wherein the ring is composed of a material having a relatively low coefficient of thermal expansion.

5. The combination defined in claim 2, wherein the ring and the journal sleeve are composed of the same material.

6. The combination defined in claim 2, wherein the ring is composed of a material having a lower coefficient of thermal expansion than that of the material of which the journal sleeve is composed.

7. The combination defined in claim 1, wherein the inside diameter of the ring is slightly larger than the outside diameter of the backs of the pads in a plane perpendicular to the plane of the shaft.

8. The combination defined in claim 1, wherein the surfaces of the pads opposite surfaces confronting the sleeve are generally cylindrical, and the inside diameter of the ring has a hyperbolic bore coacting with said surfaces.

9. The combination defined in claim 8, wherein the surfaces of the pads confronting the sleeve have pockets therein.

10. The combination defined in claim 9, including orifice pins extending through the housing and the ring and the pads to conduct fluid under pressure to said pockets.